United States Patent [19]

Kawaguchi et al.

[11] Patent Number: 4,726,160
[45] Date of Patent: Feb. 23, 1988

[54] TEMPERATURE CONTROL APPARATUS FOR ELECTRIC REFRIGERATOR

[75] Inventors: Syunro Kawaguchi; Hiroshi Tamura, both of Yokohama; Yasuhiro Ogita, Kyoto, all of Japan

[73] Assignee: Tokyo Shibaura Denki Kabushiki Kaisha, Kawasaki, Japan

[21] Appl. No.: 508,533

[22] Filed: Jun. 28, 1983

[30] Foreign Application Priority Data

Jul. 19, 1982 [JP] Japan .................... 57-124391

[51] Int. Cl.⁴ .............. G05D 23/32; F25B 41/00
[52] U.S. Cl. .................... 62/157; 62/163; 62/198
[58] Field of Search .............. 62/199, 200, 198, 197, 62/157, 231, 161, 162, 163, 164, 202, 208, 209, 211, 227, 229

[56] References Cited

U.S. PATENT DOCUMENTS 4,389,854  6/1983  Ogita et al. ..................... 62/163

FOREIGN PATENT DOCUMENTS 1808585  5/1970  Fed. Rep. of Germany .
1751420  10/1970  Fed. Rep. of Germany .
0043303  3/1980  Japan .
0033185  8/1980  Japan .

Primary Examiner—Harry Tanner
Attorney, Agent, or Firm—Cushman, Darby & Cushman

[57] ABSTRACT

An electric refrigerator is disclosed which includes first and second coolers independently disposed in a freezer and a refrigeration chamber, respectively, a compressor for delivering a refrigerant therefrom, an electromagnetic valve for switching a refrigerant channel including the first and second coolers between a first referigerant flow path for supplying the refrigerant to only the first cooler and a second refrigerant flow path for supplying the refrigerant to both the first and second coolers, and a control circuit for causing the electromagnetic valve to form the first refrigerant flow path for a predetermined time interval and for causing the electromagnetic valve to form the second refrigerant flow path by preventing interruption of the compressor when the predetermined time interval has elapsed and an air temperature in the refrigeration chamber is higehr than a predetermined temperature.

8 Claims, 9 Drawing Figures

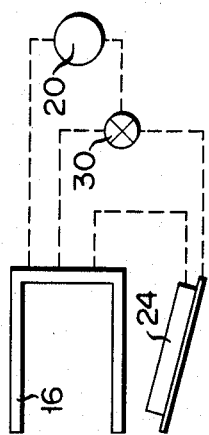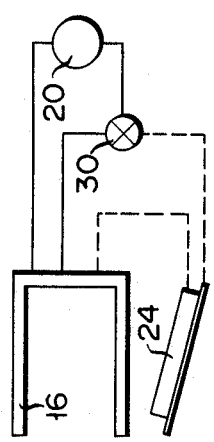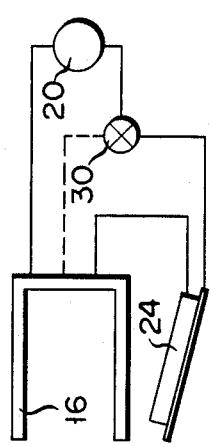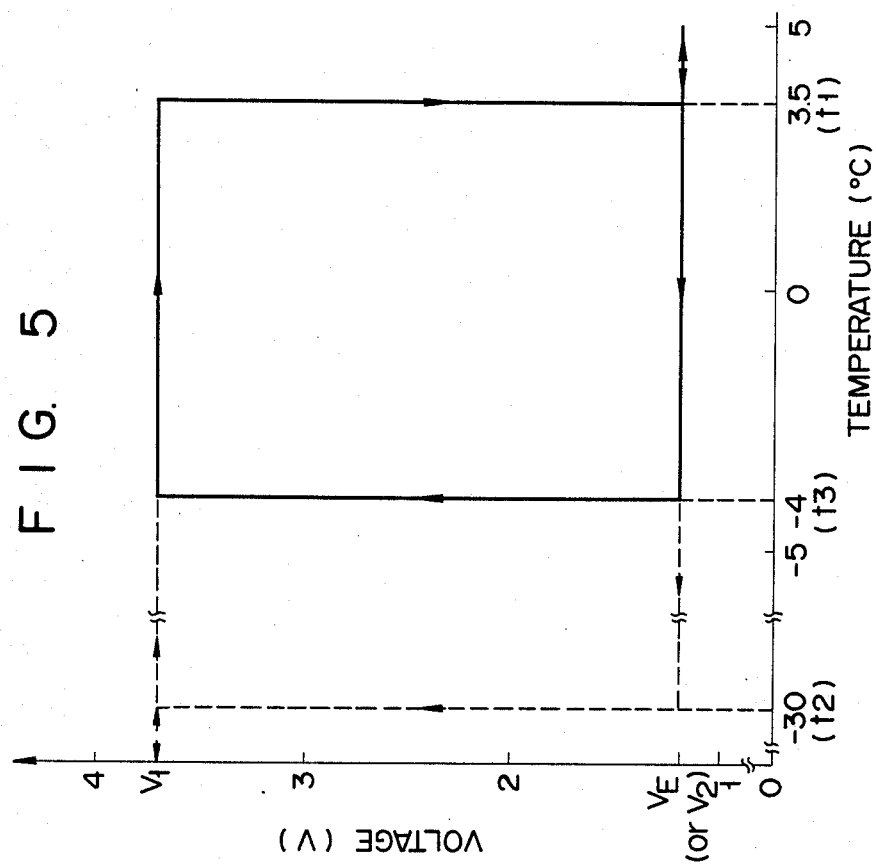

TEMPERATURE CONTROL APPARATUS FOR ELECTRIC REFRIGERATOR

BACKGROUND OF THE INVENTION

The present invention relates to an electric refrigerator and, more particularly, to a temperature control apparatus for controlling the supply of a refrigerant to coolers individually disposed in a refrigeration chamber and a freezer.

In general, in electric refrigerators each having coolers individually disposed in a refrigeration chamber and a freezer (i.e., a so-called "two-temperature type" refrigerator), the cooler for the refrigeration chamber is provided in the rear upper portion thereof. An electronic circuit controls the supply of a refrigerant to the cooler in the refrigerator of this type in the following manner. When the temperature of the cooler itself, which is detected by a temperature sensor, rises to a preset upper limit reference temperature, a temporary memory element such as a flip-flop is set to supply the refrigerant to the cooler, thereby cooling the inside of the refrigeration chamber. Another temperature sensor is arranged in the refrigeration chamber so as to detect the chamber temperature. When the chamber temperature detected by this temperature sensor drops below a preset lower limit reference temperature, the temporary memory element is reset to stop supplying the refrigerant. Temperature control is thus performed such that the refrigerator temperature lies within a range for proper food storage.

However, when the user frequently opens/closes the refrigerator door to place food therein or take it out therefrom, or when the refrigerator door is left or kept open, the temperature cannot be properly controlled even if the cooler is properly operated. The temperature of air around the sensor therefore cannot be properly lowered. As a result, the refrigerant continues to be supplied to the cooler, and the cooler becomes overloaded. A thick frost layer is deposited on the surface of the cooler, resulting in inconvenience.

Furthermore, conventionally, the logic level of the temporary memory element may change due to noise generated when the compressor or a solenoid operated valve for switching a refrigerant flow is turned on/off. Thus, refrigerant cannot be properly supplied due to erroneous operation of the temporary memory element. In order to prevent this erroneous operation, a plurality of special protective circuits are required, resulting in high cost.

A large freezer has been recently furnished in a refrigerator along with the development of "home freezing". In order to cool the freezer so as to freeze food stored in the freezer, the temperature of the surface of the freezer cooler is kept at $-40°$ C. For this reason, in the conventional refrigerator where the ON-OFF operation of the compressor is controlled with reference to the freezer temperature, a time interval after the compressor is turned off and before it is turned on again is prolonged. If the user frequently opens/closes the refrigerator door, the compressor may not be turned on even if a thermistor for detecting the chamber temperature generates a refrigeration selection signal. As a result, the refrigerator temperature rises, resulting in undesirable effects on food stored therein.

SUMMARY OF THE INVENTION

It is an object of the present invention to provide a new and improved temperature control apparatus which may be suitably applied to an electric refrigerator which has a refrigeration chamber and a freezer arranged independently of the refrigerator chamber, and which freezes food placed in the freezer in a short period of time (i.e. so-called "rapid freezing"), the apparatus being adapted to prevent a decrease in cooling efficiency of the refrigeration chamber so as to effectively perform both normal and fast freezing operations.

According to the temperature control apparatus for an electric refrigerator of the present invention, a refrigerant is supplied to both a freezing cooler (first cooler) and a refrigeration cooler (second cooler) during normal operation, while the refrigerant is supplied only to the first cooler for a predetermined period of time during the rapid freezing operation, thereby effectively freezing food in a short period of time. When the rapid freezing operation period is completed, the refrigerant compressor is not simply stopped. At that time, it is determined whether the compressor continues to supply the refrigerant or stops supplying it in accordance with the actual temperature within the refrigeration chamber. While the refrigerant is being supplied only to the first cooler, the cooling operation of the second cooler is stopped. If the temperature of the refrigeration chamber is higher than a predetermined temperature, the compressor is continuously energized after the rapid freezing operation period has ended. Simultaneously, the refrigerant flow path changes so as to supply refrigerant to both coolers. Therefore, degradation of the cooling efficiency of the refrigeration chamber is prevented, thereby achieving the above object of the present invention.

BRIEF DESCRIPTION OF THE DRAWINGS

The present invention is best understood by reference to the accompanying drawings, in which:

FIG. 5 is a graph for explaining changes in output voltage level of a comparator operated together with a refrigeration cooler temperature sensor and of a comparator operated together with a refrigeration chamber air temperature sensor, the output voltage level having hysteresis characteristics;

FIGS. 6A to 6C respectively show refrigerant circuit models each of which has a different refrigerant flow path between the freezer cooler and the refrigeration cooler.

DETAILED DESCRIPTION OF THE PREFERRED EMBODIMENTS

Figure 1:
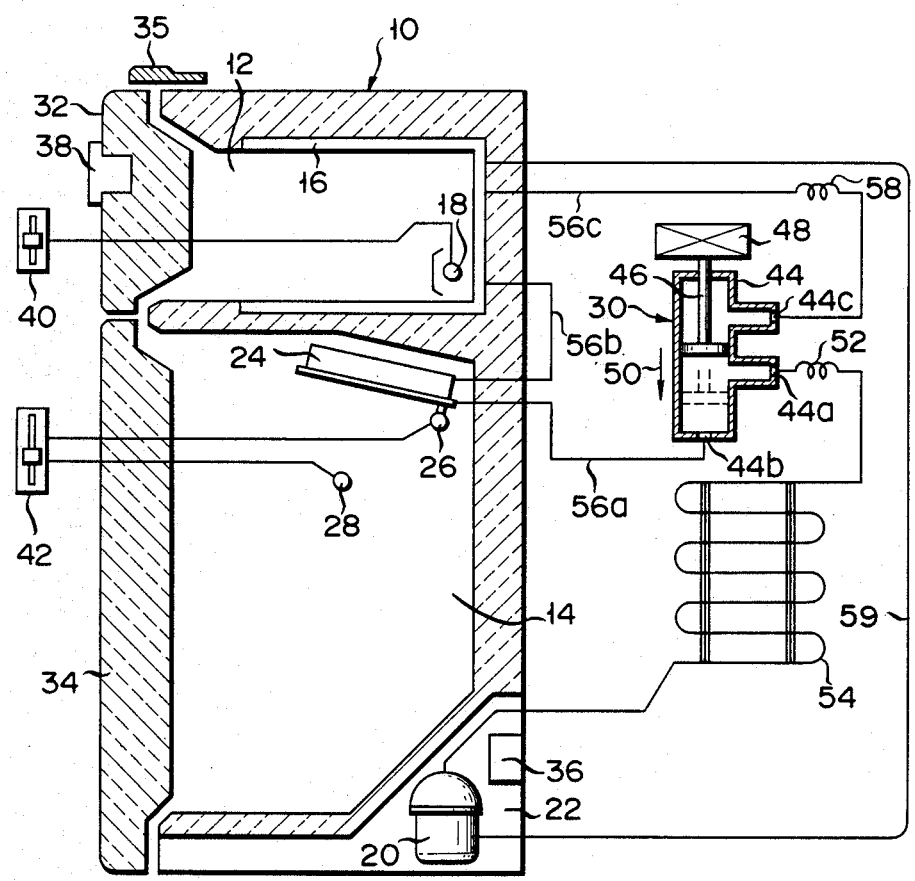
FIG. 1 is a side view showing the overall construction of an electric refrigerator according to an embodiment of the present invention.

An electric refrigerator having a temperature control apparatus according to an embodiment of the present invention is shown in FIG. 1. A refrigerator main body 10 has two independent rooms or chambers (i.e., a freezer 12 and a cold chamber or refrigeration chamber 14). A first cooler (freezer cooler) 16 is mounted on an inner wall of the freezer 12. The first cooler 16 serves to freeze food placed in the freezer 12. A first thermosensor 18 such as a thermistor is arranged in the freezer 12 to detect an air temperature therein. The first thermosensor 18 causes a compressor 20 in a power/control chamber 22 to turn on/off in accordance with temperature data detected by the first thermosensor 18.

A second cooler (refrigeration cooler) 24 is fixed at the rear upper portion of the refrigeration chamber 14 so as to be exposed to the atmosphere within the refrigeration chamber 14. A second thermosensor 26 is arranged with respect to the second cooler 24 to detect the temperature of the outer surface of the cooler 24. Furthermore, a third thermosensor 28 is arranged in the refrigeration chamber 14 apart from the refrigeration cooler 24, thereby detecting the air temperature within the refrigeration chamber 14. An electromagnetic valve 30 is operated in accordance with temperature data detected by the second and third thermosensors 26 and 28 so as to change a refrigerant flow path. As a result, the refrigerant is selectively supplied to the freezer cooler 16 and the refrigeration cooler 24.

Doors 32 and 34 are mounted by known hinges 35 on the freezer 12 and the refrigeration chamber 14, respectively, so as to open/close the openings thereof. When the doors 32 and 34 are closed, the freezer 12 and the refrigeration chamber 14 are thermally shielded by the doors 32 and 34, respectively. A rubber member (not shown in FIG. 1) is fitted air-tightly between the door 32 of the freezer 12 and between the door 34 and the refrigeration chamber 14.

A control section 36 is arranged in the power/control chamber 22 of the refrigerator so as to electrically control the overall operation of the refrigerator. The control section 36 performs the control operation in response to operation signals transmitted from an operation section 38 disposed on the front surface of the door 32. The operation section 38 has a freezer control switch 40 and a refrigeration control switch 42 which are manually controlled by the user or operator. The user can set proper cooling temperatures of the freezer 12 and the refrigeration chamber 14 respectively by means of the control switches 40 and 42.

The electromagnetic valve 30 has a housing 44 with first to third ports 44a, 44b and 44c and a valve plug 46 slidably mounted in the housing 44. The position of the valve plug 46 in the housing 44 is controlled by a mechanically elastic member such as a coil spring (not shown) and a magnetic coil 48. While the magnetic coil 48 is deenergized, the valve plug 46 is biased by the elastic member (not shown) and is forcibly positioned in the position indicated by the solid line in FIG. 1 so that the first port 44a communicates with the second port 44b. However, when the coil 48 is energized, the magnetic force of the coil 48 is greater than the biasing force of the elastic member, so that the valve plug 46 slides within the housing 44 in the direction indicated by an arrow 50. When the magnetic force is balanced with the biasing force, the valve plug 46 is stopped in the position indicated by a dotted line in FIG. 1 so that the first port 44a communicates with the third port 44c. When the magnetic coil 48 is deenergized again, the magnetic coil 48 is biased by the biasing force of the elastic member and returns to its initial position.

The first port 44a of the electromagnetic valve 30 is connected to a refrigerant outflow end of the compressor 20 through a first capillary tube 52 and a condenser 54. The second port 44b of the electromagnetic valve 30 is connected to the third port 44c thereof through a refrigerant supply tube 56a, the refrigeration cooler 24, a refrigerant supply tube 56b, the freezer cooler 16, a refrigerant supply tube 56c, and a second capillary tube 58. The refrigerant outflow end of the freezer cooler 16 is coupled to the refrigerant inflow end of the compressor 20 through a pipe 59.

Figure 2:
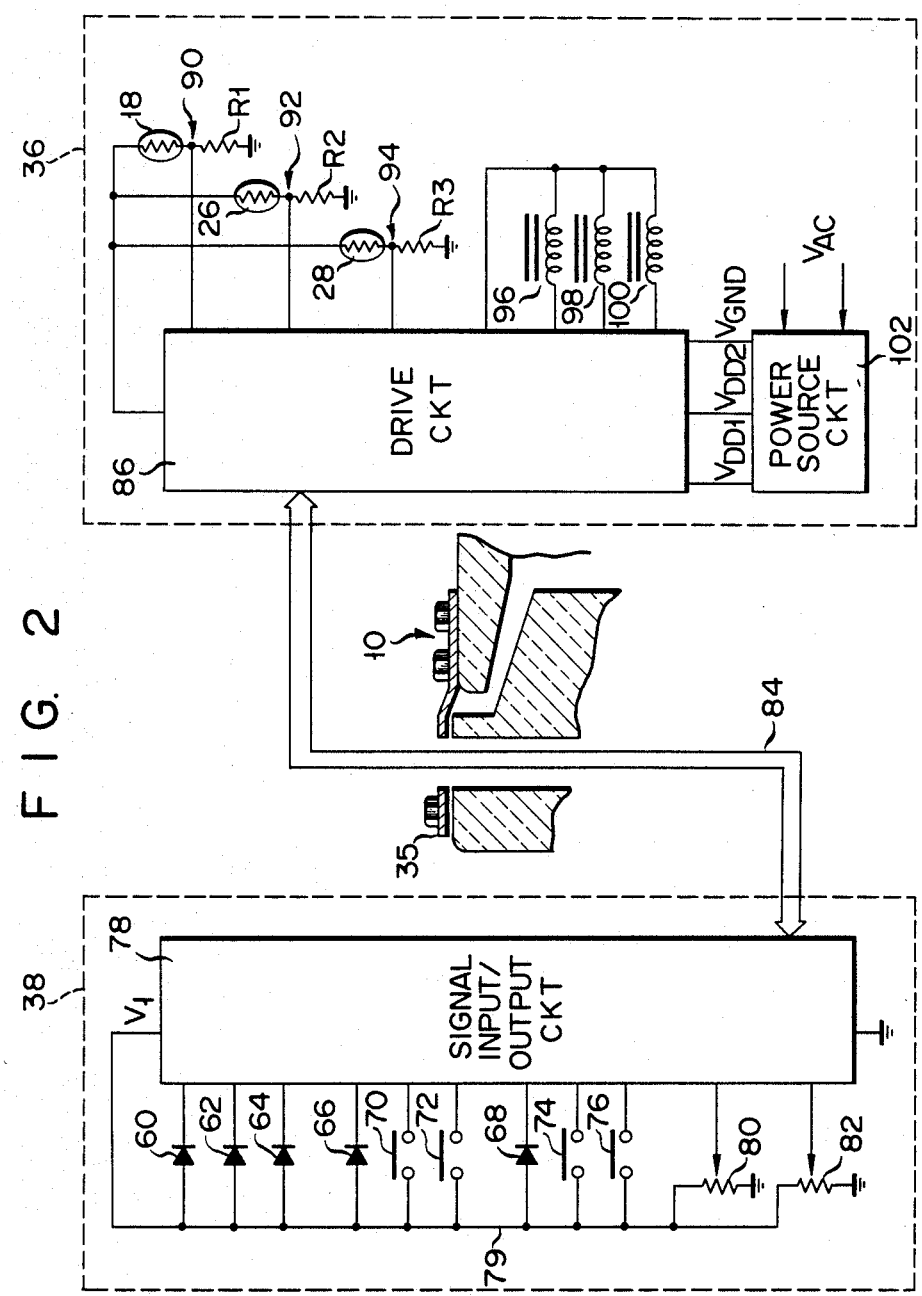
FIG. 2 is a block diagram showing a control section and an operation section of the refrigerator shown in FIG. 1.

FIG. 2 is a block diagram showing the circuit arrangement of the control section 36 and the operation section 38. The operation section 38 includes freezer temperature indicator light-emitting diodes (LEDs) 60, 62 and 64, an LED 66 indicating a defrost operation in the freezer 12, a fast freezing indicator LED 68, and various types of switches 70, 72, 74 and 76, in addition to the control switches 40 and 42 shown in FIG. 1. The switch 70 serves as an interrupt switch (defrost start switch) when the user starts defrosting the freezer 12. The switch 72 serves as an interrupt switch (defrost stop switch) which interrupts the defrost operation. The switches 74 and 76 respectively serve as a rapid freezing start switch and a rapid freezing stop switch. The above-mentioned LEDs and switches are connected to a signal input/output circuit 78 and a line 79 and are connected parallel to each other. Variable resistor switches 80 and 82 change their resistances upon operation of the control switches 40 and 42 (FIG. 1), respectively.

The signal input/output circuit 78 is connected to a drive circuit 86 in the control section 36 through a data bus 84. The data bus 84 allows data transmission between the circuits 78 and 86. LED drive signals supplied from the control section 36 are transferred to the operation section 38 through the data bus 84. The LEDs go on or flicker in response to the respective LED drive signals. The switching signals from the switches 70, 72, 74 and 76, and the variable resistor switches 80 and 82 are transferred to the control section 36 through the data bus 84. Temperature detectors 90, 92 and 94 respectively comprise a series circuit of the thermosensor 18 and a resistor R1, a series circuit of the thermosensor 26 and a resistor R2, and a series circuit of the thermosensor 28 and a resistor R3, and are connected parallel to each other with respect to the drive circuit 86. A relay coil 96 for controlling the ON/OFF operation of the compressor 20, a relay coil 98 for driving a relay switch 114 (FIG. 3) which in turn drives the electromagnetic valve 30, and a relay coil 100 for driving a defrost heater 118 (FIG. 3) are connected parallel to each other with respect to the drive circuit 86. The signal input/output circuit 78 and the drive circuit 86, which respectively have hybrid arrangements, are powered by a power source circuit 102 arranged in the control circuit 36. The power source circuit 102 receives a commercial power source $V_{AC}$ (e.g., AC 100 V) and generates a power source voltage $V_{DD1}$ of DC 6.2 V to be supplied to the operation section 38 and the temperature detectors 90, 92 and 94 and a voltage $V_{DD2}$ of DC 12 V to be supplied to the relay coils 96, 98 and 100.

Figure 3:
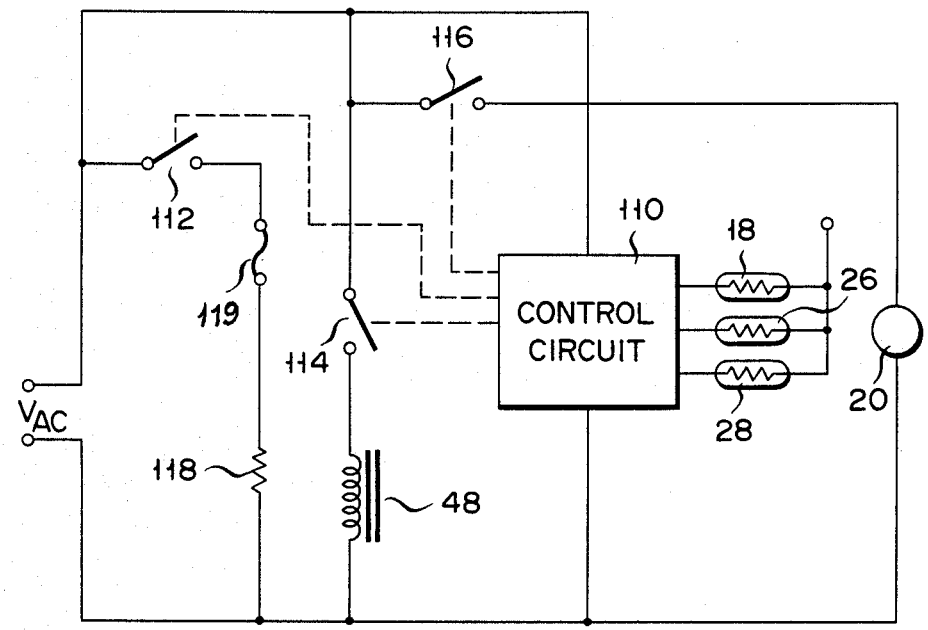
FIG. 3 is a circuit diagram showing the overall arrangement of a temperature control circuit including the control and operation sections shown in FIG. 2.

FIG. 3 is a circuit diagram showing the basic arrangement of the electric refrigerator circuit having a control circuit 110 which includes the control and operation sections 36 and 38 shown in FIG. 2. The control circuit 100 properly turns on/off a defrost relay switch 112, the electromagnetic valve relay switch 114 and a compressor relay switch 116. The defrost relay switch 112 is connected to an external commercial AC power source (not shown) through the defrost heater 118 and fuse 119. Therefore, when the defrost relay switch 112 is turned on under the control of the control circuit 110, an AC current flows in the defrost heater 118. The electromagnetic valve relay switch 114 is connected to the external AC power source through the magnetic coil 48 coupled to the electromagnetic valve 30. Therefore, when the relay switch 114 is turned on, the magnetic coil 48 is energized, thereby driving the valve plug 46 of the electromagnetic valve 30, as previously mentioned. The compressor relay switch 116 is connected to the commercial AC power source through the compressor 20. When the relay switch 116 is turned on, the compressor 20 is energized, thereby starting the delivery of refrigerant.

Figure 4:
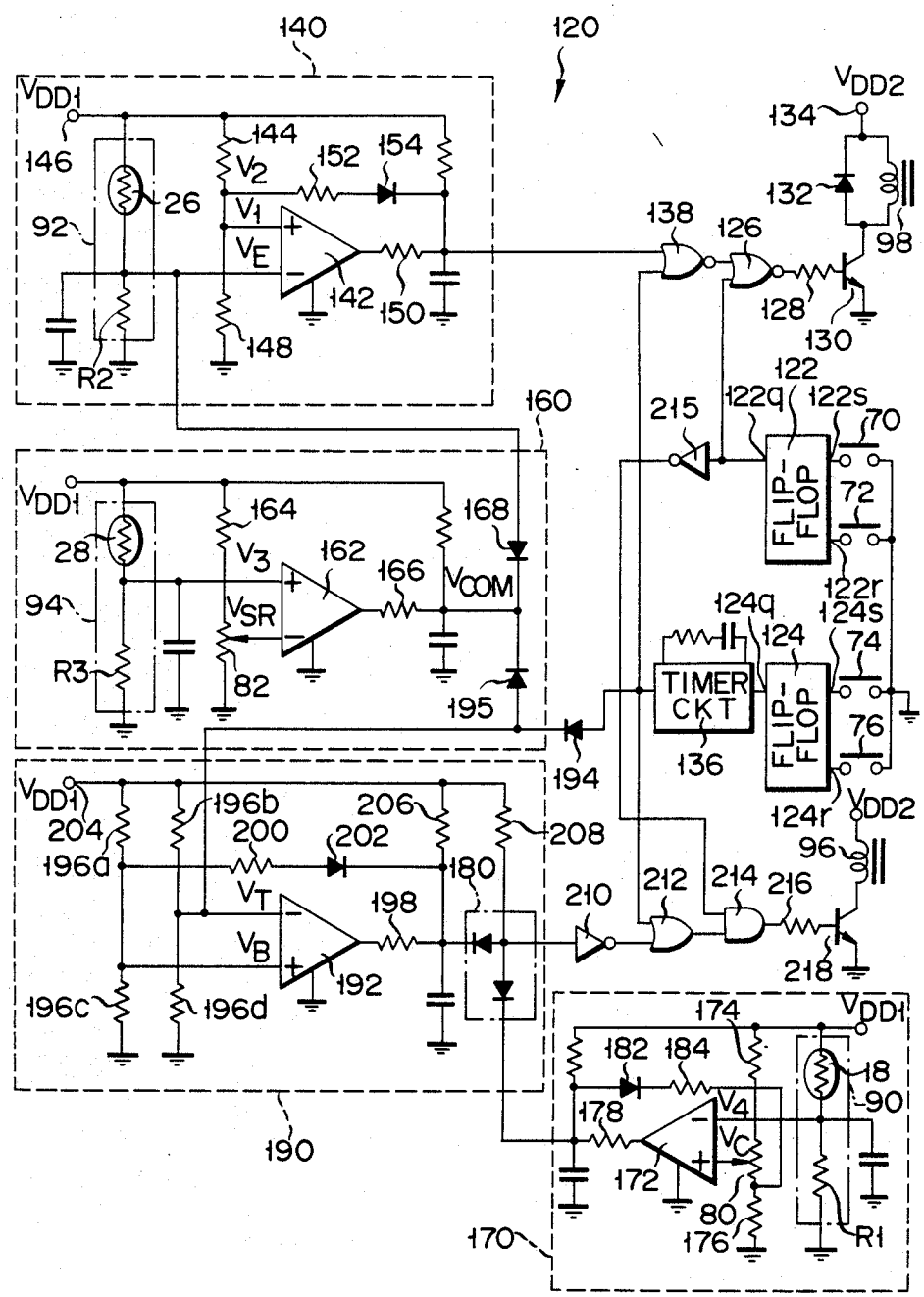
FIG. 4 is a circuit diagram showing a refrigerant flow control circuit which is included in the control circuit shown in FIG. 3 and which properly controls the refrigerant flow according to the temperature control of the refrigerator shown in FIG. 1.

FIG. 4 is a circuit diagram of a refrigerant control circuit 120 which is included in the control circuit 110 shown in FIG. 3 and which properly controls the refrigerant flow to thereby control the temperature of the refrigerator having the two independent chambers (i.e., the freezer 12 and the refrigeration chamber 14) shown in FIG. 1. The electromagnetic valve 30 is opened/closed under the control of the refrigerant flow control circuit 120, thereby changing the refrigerant flow in the refrigerator. The refrigerant control circuit 120 is arranged such that rapid freezing has priority over general temperature control on the basis of temperature data detected by the thermosensor and such that defrosting also has priority over both general temperature control and rapid freezing. The arrangement and operation of the control circuit 120 will be described in detail hereinafter.

Referring to FIG. 4, the defrost start switch 70 and the defrost stop switch 72 are connected to an input set terminal 122s and an input reset terminal 122r, respectively, of a flip-flop 122. An output terminal (Q terminal) 122q of the flip-flop 122 is connected to one input terminal of a NOR gate 126. The output terminal of the NOR gate 126 is connected to the base of a transistor 130 through a resistor 128. The collector of the transistor 130 is connected to a parallel circuit of a diode 132 and the relay coil 98 for driving the electromagnetic valve 30. When the transistor 130 is rendered conductive in response to an output signal from the NOR gate 126, the relay coil 98 is energized through a current input terminal 134, so that the electromagnetic valve 30 performs switching of the refrigerant flow path.

The rapid freezing start switch 74 and the rapid freezing stop switch 76 are connected to an input set terminal 124s and an input reset terminal 124r, respectively, of a flip-flop 124. An output terminal 124q of the flip-flop 124 is connected to one input terminal of a NOR gate 138 through a timer circuit (i.e., monostable multivibrator) 136 for counting a rapid freezing time interval. The output terminal of the NOR gate 138 is connected to the other input terminal of the NOR gate 126. An output signal from a first temperature control circuit 140 for detecting a temperature of the refrigeration cooler 24 of the refrigerator shown in FIG. 1 is supplied to the other input terminal of the NOR gate 138.

The first temperature control circuit 140 includes a comparator 142 which comprises a differential amplifier. The non-inverting input terminal of the comparator 142 is connected to a power source terminal 146 which receives a power source voltage $V_{DD1}$ supplied from the power source circuit 102 and is grounded through a resistor 148. The inverting input terminal of the comparator 142 receives a temperature detection voltage signal $V_E$ from the temperature detector 92. It should be noted that the temperature detection voltage signal $V_E$ indicates a temperature of the outer surface of the refrigeration cooler 24. A divided voltage $V_1$ from resistors 144 and 148 constituting a bridge circuit together with the temperature detector 92 is applied to the non-inverting input terminal of the comparator 142. The comparator 142 compares the voltage $V_E$ with the voltage $V_1$ and supplies a voltage signal (comparison signal) to the NOR gate 138 through a resistor 150. The comparator 142 is connected in parallel with a series circuit of a resistor 152 and a diode 154 between the non-inverting input terminal thereof and the resistor 150. The voltage output signal from the comparator 142 is inverted at different temperature levels t1 and t2 so as to provide hysteresis loop characteristics, as shown in FIG. 5. When the voltage $V_E$ is higher than the voltage $V_1$, the output voltage signal from the comparator 142 goes to a low level. Therefore, a current loop of the power source terminal 146, the resistor 144, the resistor 152, the diode 154, the resistor 150, and the comparator 142 in the order named is formed. If a voltage applied to the non-inverting input terminal of the comparator 142 is defined as $V_2$, the voltage $V_2$ is lower than the voltage $V_1$. Even when the voltage $V_E$ is lower than the voltage $V_1$, the output signal from the comparator 142 is kept at a low level until the voltage $V_E$ becomes lower than the voltage $V_2$. When the voltage $V_E$ becomes lower than the voltage $V_2$, the output voltage signal from the comparator 142 goes high. As may be apparent from the above description, the first temperature control circuit 140 serves to invert the output voltage therefrom at two different reference temperature levels in accordance with the hysteresis characteristics thereof.

The inverting input terminal of the comparator 142 is connected to a second temperature control circuit (temperature control circuit in the refrigeration chamber 14) 160. The second temperature control circuit 160 has a comparator 162. The noninverting input terminal of the comparator 162 receives a temperature detection voltage signal $V_3$ which is produced by the temperature detector 94 for detecting the air temperature within the refrigeration chamber 14 and which is converted by the third thermosensor 28 into an electric signal. The inverting input terminal of the comparator 162 receives a divided voltage $V_{SR}$ from a resistor 164 and the variable resistor 82 which, together with the temperature detector 94, constitute a bridge circuit. The comparator 162 compares the voltage $V_3$ with the voltage $V_{SR}$ and supplies a comparison signal $V_{COM}$ to the inverting input terminal of the comparator 142 through a resistor 166 and a diode 168. When the voltage $V_3$ becomes higher than the voltage $V_{SR}$, the output voltage signal from the comparator 162 goes high. In this case, the diode 168 is reverse biased so as to prevent supply of the output voltage signal from the comparator 162 to the temperature control circuit 140. The temperature control circuit 140 is thus not influenced by the output signal from the comparator 162 at all. However, when the voltage $V_3$ becomes lower than the voltage $V_{SR}$, the output voltage signal from the comparator 162 goes low. The diode 168 is forward biased to flow a current to the comparator 162 through the diode 168 and a resistor 166. In this condition, the resistor 166 and the resistor R2 connected in series with the thermosensor 26 constitute an equivalent parallel circuit, thereby decreasing the composite resistance. The level of the voltage signal $V_E$ supplied to the inverting input terminal of the comparator 142 is thus decreased. When the voltage $V_E$ becomes lower than $V_2$, the output voltage level of the comparator 142 is forcibly inverted.

As shown in the hysteresis loop in FIG. 5, according to this embodiment, when the surface temperature of the cooler 24 is set at +3.5° C. (=t1), the voltage $V_E$ becomes higher than $V_1$ where these voltages are supplied to the comparator 142 in the temperature control circuit 140. When the surface temperature of the cooler 24 is set at −30° C. (=t2), the voltage $V_E$ becomes higher than the voltage $V_2$. The variable resistor switch 82 is adjusted such that the air temperature within the refrigeration chamber is set at a predetermined temperature (e.g., −4° C. (=t3)) within a range between 3.5° C. and −30° C. during a time interval in which the voltage $V_E$ is lower than the voltage $V_2$. In other words, the resistance of the variable resistor switch 82 is adjusted such that the output voltage level of the comparator 162 in the temperature control circuit 160 is inverted when the air temperature within the refrigeration chamber 14 becomes −4° C. (=t3). Temperature t3 is preset by the variable resistor switch 82 and corresponds to the voltage $V_{SR}$. When the air temperature in the refrigeration chamber 14 reaches temperature t3 (e.g. −4° C.) before the surface temperature of the cooler 24 is decreased to −30° C., the air temperature within the refrigeration chamber 14 which is detected by the thermosensor 28 has priority, so that the output voltage signal from the comparator 142 of the temperature control circuit 140 is forcibly inverted. Therefore, the operating level of the transistor 130 and the operating condition of the electromagnetic valve 30 are forcibly and sequentially changed, thereby changing the refrigerant flow.

Referring again to FIG. 4, reference numeral 170 denotes a third temperature control circuit (freezer cooler temperature control circuit for controlling the ON/OFF operation of the compressor 20) in accordance with the actual temperature within the freezer 12. The third temperature control circuit 170 has a comparator 172. A temperature detection voltage signal $V_4$ is supplied from the thermosensor 18 to the inverting input terminal of the comparator 172. A voltage $V_C$ (the OFF reference voltage of the compressor 20) which is determined by resistors 174 and 176 and the variable resistor switch 80 which, together with a temperature detection network 90, constitute a bridge circuit is supplied to the noninverting input terminal of the comparator 172. The comparator 172 compares the voltage $V_4$ with the voltage $V_C$ and produces a comparison signal. This comparison signal is supplied, through a resistor 178, to one input of a two-input AND gate 180 constituted by two diodes. A series circuit of a diode 182 and a resistor 184 is connected between the resistor 178 and the common node between the variable resistor switch 80 and the resistor 176.

The AND gate 180 is included in a compressor control circuit 190. The compressor control circuit 190 has a comparator 192. The inverting input terminal of the comparator 192 receives a high level voltage signal $V_T$ generated by the timer circuit 136 through a diode 194.

It should be noted that the count of the timer circuit 136 is preset in response to the output signal from the flip-flop 124, which is set by the fast freezing start switch 74. The cathode of the diode 194 is connected to the cathode of the diode 168 through a diode 195. The noninverting input terminal of the comparator 192 receives a voltage $V_B$ divided by resistors 196a and 196c among resistors 196a, 196b, 196c, and 196d which constitute a bridge circuit. The voltage $V_T$ is higher than the voltage $V_B$ while the timer circuit 136 is ON so that the output voltage signal from the comparator 192 is set at low level. This low-level comparison signal is supplied to the other input terminal of the AND gate 180 through a resistor 198. A series circuit of a resistor 200 and a diode 202 is provided between the resistor 198 and the common node between the resistors 196a and 196c. This series circuit maintains the low-level potential of the comparison signal until the count of the timer circuit 136 reaches a predetermined value. When the count reaches the predetermined value, the inverting input terminal of the comparator 192 receives a voltage $V_B{}'$ ($V_B{}' > V_B$) divided by the resistors 196b and 196d, so that the comparator 192 continuously produces a low-level comparison signal and supplies it to the two-input AND gate 180. A power source terminal 204 is also connected to the two-input AND gate 180 through resistors 206 and 208.

The output signal from the two-input AND gate 180 is supplied to one input terminal of an OR gate 212 through an inverter 210. The other input terminal of the OR gate 212 is connected to the output terminal of the timer circuit 136. The output terminal of the OR gate 212 is connected to one input terminal of an AND gate 214 which has its other input terminal connected to the output terminal of the flip-flop 122 through an inverter 215. The output terminal of the AND gate 214 is connected through a resistor 216 to the base of a switching transistor 218 to which the aforementioned relay coil 96 for the compressor 20 is connected at the collector thereof. Therefore, the transistor 218 performs the ON/OFF operation in response to the output signal from the two-input AND gate 180, thereby controlling the ON/OFF operation of the compressor 20.

The operation of the temperature control apparatus for an electric refrigerator according to this embodiment of the present invention will be described hereinafter. Even while general cooling or rapid freezing for freezing fresh fish in a short period of time, the refrigerator shown in FIG. 1 may be switched to a defrost mode which has priority over any other mode, as will be described later, when the defrost start switch 70 is operated.

When the defrost start switch 70 is turned on, the flip-flop 122 is set. A high level signal is generated from the output terminal 122q of the flip-flop 122. A low level signal is then produced from the NOR gate 126, so that the transistor 130 is rendered nonconductive. The relay coil 98 is not energized, so that the relay switch 114 is kept open. As a result, the magnetic coil 48 is not energized. The valve plug 46 of the electromagnetic valve 30 is biased by the spring (not shown) and is held in the position indicated by the solid line in FIG. 1 (i.e., such that the first port 44a communicates with the second port 44b). At the same time, the high level signal from the flip-flop 122 is inverted by the inverter 215, and the resulting low level signal from the inverter 215 is supplied to the AND gate 214. Therefore, the low level signal is supplied from the AND gate 214 to the base of the transistor 218, and the transistor 218 is turned off. The relay coil 96 is deenergized, and the compressor 20 is turned off. As a result, since the refrigerant flow is stopped throughout the refrigerator of FIG. 1 (FIG. 6A illustrates this condition), the temperature within the refrigeration chamber 14 rises over time. Accordingly, the surface temperature of the refrigeration cooler 24 rises, thereby removing frost formed on the surface thereof.

When the frost is removed from the refrigeration cooler 24 and the defrost stop switch 72 is pushed and turned on, the output signal from the output terminal 122q of the flip-flop 122 goes low. Therefore, the defrost operation is interrupted.

The rapid freezing takes second priority over any other operation except for defrosting. When the user pushes the rapid freezing start switch 74 which is then turned on, the flip-flop 124 is set and a high level signal is produced from the output terminal 124q thereof. Therefore, the timer circuit 136 is started. A high level signal is supplied from the timer circuit 136 to the NOR gate 138, and the NOR gate 138 produces a low level signal which is supplied to the NOR gate 126. The NOR gate 126 also receives the low level signal from the flip-flop 122. The NOR gate 126 then generates a high level signal which is supplied to the base of the transistor 130. The transistor 130 is thus turned on, the relay coil 98 is energized, and the relay switch 114 (FIG. 3) is closed. As a result, the magnetic coil 48 is energized. The valve plug 46 of the electromagnetic valve 30 shown in FIG. 1 is held at the position indicated by the dotted line in FIG. 1 (i.e., such that the first port 44a communicates with the third port 44c).

When the rapid freezing start switch 74 is operated, the high level signal from the timer circuit 136 is also supplied to the OR gate 212. The OR gate 212 supplies the high level signal to the one input terminal of the AND gate 214. The other input terminal of the AND gate 214 receives the high level signal obtained by inversion of the output signal from the flip-flop 122 by the inverter 215. A high level signal is then supplied from the output terminal of the AND gate 214 to the base of the transistor 218, so that the transistor 218 is rendered conductive. The relay coil 96 is then energized, the relay switch 116 (FIG. 3) is closed, and the compressor 20 starts delivering the refrigerant therefrom. As previously described, since the first port 44a of the electromagnetic valve 30 (FIG. 1) communicates with the third port 44c thereof, the refrigerant delivered from the compressor 20 is supplied only to the freezer cooler 16 (among the coolers 16 and 24) through the electromagnetic valve 30. Therefore, the freezer 12 is cooled rapidly as illustrated by the circuit model in FIG. 6B.

When the fast freezing time interval preset in the timer circuit 136 has elapsed, the output signal from the timer circuit 136 goes low. In this case, if the temperature in the freezer 12 has fallen to a target (preset) temperature, the signal supplied to the OR gate 212 then goes low. The output signal from the AND gate 214 then goes low, and the transistor 218 is rendered nonconductive. It is thus assumed that the compressor 20 is stopped. However, according to this embodiment of the present invention, the compressor 20 continues to operate for the following reason. The non-inverting input terminal of the comparator 192 included in the control circuit 190 receives the voltage $V_B$ divided by the resistors 196a and 196c as previously described. When the fast freezing time interval preset in the timer circuit 136 has elapsed, the voltage at the non-inverting input terminal of the comparator 192 is set at $V_B'$. Therefore, the voltage $V_B'$ is higher than the voltage $V_B$ at the comparator 192. The comparator 192 then generates a low level signal. Therefore, the output signal from the AND gate 180 goes low and is inverted by the inverter 210 to a high level signal. This high level signal is supplied to the AND gate 214 through the OR gate 212. The AND gate 214 simultaneously receives the high level signal from the flip-flop 122 through the inverter 215. A high level signal is supplied from the output terminal of the AND gate 214 to the transistor 218, so that the transistor 218 is kept conductive. Therefore, the compressor 20 continues to deliver the refrigerant therefrom.

Under this condition, the NOR gates 138 and 126 are turned off in response to the low level signal from the timer circuit 136 so that the transistor 130 is rendered nonconductive. As a result, the magnetic coil 48 of the electromagnetic valve 30 is deenergized. The valve plug 46 of the electromagnetic valve 30 is moved to the position indicated by the solid line in FIG. 1 (such that the first port 44a communicates with the second port 44b). The refrigerant is then supplied from the compressor 20 to the coolers 16 and 24 in accordance with the circuit model indicated by the solid line in FIG. 6C. The refrigeration chamber 14 is cooled by the cooler 24 after fast freezing is terminated.

When the air temperature within the refrigeration chamber 14 which is detected by the thermosensor 28 drops below the target temperature (i.e. $-4°$ C.), the voltage $V_3$ becomes lower than the voltage $V_{SR}$. Therefore, the output signal from the comparator 162 goes low. The diode 195 is then forward biased, and the potential level $V_T'$ at the inverting input terminal of the comparator 192 in the control circuit 190 forcibly goes low. As a result, the input voltages of the comparator 192 are set such that when the voltage $V_T'$ becomes lower than the voltage $V_B$, the output signal from the comparator 192 goes high. This high level signal is supplied to the one input terminal of the AND gate 180. In this case, a high level signal is also supplied to the other input terminal of the AND gate 180, since the freezer 12 is sufficiently cooled by fast freezing and the input voltages to the comparators 172 are set such that the voltage $V_4$ is lower than the voltage $V_C$. In this condition, the high level signal from the AND gate 180 is inverted by the inverter 210, so that the OR gate 212 receives a low level signal. The OR gate 212 thus supplies a low level signal to the one input terminal of the AND gate 214. The other input terminal of the AND gate 214 receives a high level signal from the inverter 215 since the defrost start switch 70 is OFF. The AND gate 214 supplies a low level signal to the transistor 218, and the transistor 218 is rendered nonconductive. As a result, the compressor 20 is stopped. This state is illustrated as a refrigerant circuit model in FIG. 6A.

Even after the fast freezing operation (i.e., in which refrigerant is supplied only to the freezer cooler 16) is stopped, the compressor 20 does not stop, and the refrigeration chamber 14 is cooled again. Thus, the air within the refrigeration chamber 14 does not remain at a considerably high temperature immediately after fast freezing is performed.

An antifrost operation will now be described wherein formation of a frost layer on the surface of the cooler 24 is prevented when the door 34 is kept open.

In the control circuit 170, the variable resistor switch 80 connected to the noninverting input terminal of the comparator 172 is adjusted such that (1) the comparator 172 generates a low level signal when the freezer temperature is decreased to $-10°$ C. or lower and the voltage $V_4$ becomes higher than the voltage $V_C$, and (2) the comparator 172 generates a high level signal when the freezer temperature reaches $-20°$ C. and the voltage $V_4$ becomes lower than the voltage $V_C$. Assume that the input voltages to the comparator 172 are set such that the voltage $V_4$ is higher than the voltage $V_C$. The output voltage from the AND gate 180 then goes low, and the inverter 210 generates a high level signal. This high level signal is supplied to the AND gate 214 through the OR gate 212. A high level signal is supplied from the AND gate 214 to the transistor 218 so that the transistor 218 is rendered conductive and the compressor 20 (FIGS. 1 and 3) is energized.

In the above operating condition of the compressor 20, when the surface temperature of the refrigeration cooler 24 is set to be 3.5° C. or higher, the air temperature within the refrigeration chamber 14 is regarded as being 3.5° C. or higher. No frost is formed on the surface of the cooler 24. In this case, the input voltages to the comparator 162 in the temperature control circuit 160 are set such that the voltage $V_3$ is higher than the voltage $V_{SR}$. The comparator 162 thus generates a high level signal. As a result, the diode 168 is reverse biased and is rendered nonconductive. The temperature control circuit 140 is substantially disconnected from the diode 168 from the viewpoint of operating conditions.

When the temperature of the refrigeration cooler 24 is higher than 3.5° C. and the input voltages to the comparator 142 are set such that the voltage $V_E$ is greater than the voltage $V_1$, the output signal from the comparator 142 is set at low level, as is apparent from FIG. 5. The two input terminals of the NOR gate 138 receive low level signals (i.e., the timer circuit 136 generates a low level signal), so that the NOR gate 138 generates a high level signal. As a result, the output signal from the NOR gate 126 is set at low level and then the transistor 130 is rendered nonconductive. The valve plug 46 of the electromagnetic valve 30 is set in the position indicated by the solid line in FIG. 1 so as communicate the first port 44a with the second port 44b.

The refrigerant is circulated from the compressor 20 to the coolers 16 and 24, as shown in FIG. 6C. As a result, the refrigeration chamber 14 is cooled by the cooler 24. Even after the surface temperature of the refrigeration cooler 24 becomes 3.5° C. or lower, the output signal from the comparator 142 is not inverted, and the operating condition of the electromagnetic valve 30 does not change (i.e., the first port 44a still communicates with the second port 44b). In the same manner as described above, the refrigerant continues to circulate to the coolers 16 and 24. As a result, both the freezer 12 and the refrigeration chamber 14 are cooled.

Thereafter, the actual temperature within the refrigeration chamber 14 which is detected by the thermosensor 28 is lowered below $-4°$ C. ($=t_3$), and the input voltages to the comparator 162 are set such that the voltage $V_3$ is lower than the voltage $V_{SR}$. Therefore, the output signal from the comparator 162 goes low, so that the diode 168 is forward biased and is rendered conductive. A current flows in the comparator 162 from the power source terminal 146 through the thermosensor 26, the diode 168, and the resistor 166 in the order named. The input voltage $V_E$ to the inverting input terminal of the comparator 142 is forcibly decreased, thereby satisfying an inequality $V_E < V_2$. In this case, the output voltage from the comparator 142 goes high. The NOR gate 138 produces a low level signal, and then the NOR gate 126 produces a high level signal. Therefore, the transistor 130 is rendered conductive so that the valve plug 46 of the electromagnetic valve 30 is switched to the position indicated by the dotted line in FIG. 1. The refrigerant circulates from the compressor 20 to only the freezer cooler 16 along the circulation path shown in FIG. 6B.

When the output signal from the comparator 142 is set at high level, the diode 154 is rendered nonconductive. The voltage applied to the noninverting input terminal of the comparator 142 corresponds to the voltage $V_1$ (for $V_1 > V_2$) obtained by dividing the power source voltage received from the power source terminal 146 by the resistors 144 and 148. When the actual temperature of the refrigeration chamber 14 falls within a range between $-4°$ C. and $+3.5°$ C., the output signal from the comparator 162 goes high again. However, since the input voltage $V_E$ applied to the inverting input terminal of the comparator 142 is lower than the voltage $V_1$, the output voltage signal therefrom is continuously held at high level. This condition is maintained until the actual surface temperature of the refrigeration cooler 24 which is detected by the thermosensor 26 exceeds $+3.5°$ C. When the surface temperature exceeds $+3.5°$ C., the voltage $V_E$ becomes higher than the voltage $V_1$, and the output voltage signal from the comparator 142 is inverted and set at low level. The transistor 130 is rendered nonconductive again, and the valve plug 46 of the electromagnetic valve 30 is moved to the position indicated by the solid line in FIG. 1 (i.e. such that the first port 44a communicates with the second port 44b). Therefore, the refrigeration chamber 14 is cooled again by the cooler 24.

Now assume that the door 34 (FIG. 1) is kept open. In this condition, warm air enters the refrigeration chamber 14. The air temperature in the refrigeration chamber 14 cannot be lowered to the proper temperature ($-4°$ C.) even if the refrigeration cooler 24 is properly operated. The cooler 24 becomes overloaded, and a thick frost layer is formed on the surface of the cooler 24 which is then excessively cooled which is an undesirable phenomenon. However, according to the present invention, the above drawback can be completely removed. The input voltages to the comparator 142 are set such that, when the actual surface temperature of the cooler 24 which is detected by the thermosensor 26 falls below a predetermined temperature (e.g., $-30°$ C. in this embodiment), the voltage $V_E$ becomes lower than the voltage $V_2$. The output voltage signal from the comparator 142 goes high, the diode 154 is rendered nonconductive, and the output voltage signal from the NOR gate 126 goes high. The transistor 130 is then rendered conductive and the valve plug 46 of the electromagnetic valve 30 is held in the position indicated by the dotted line in FIG. 1. Therefore, the first port 44a of the electromagnetic valve 30 does not communicate with the second port 44b thereof but with the third port 44c thereof. The refrigerant is then circulated in the manner as shown in FIG. 6B (i.e., the refrigerant does not flow in the cooler 24). Cooling by the cooler 24 in the refrigeration chamber 14 is forcibly stopped, and the air temperature in the refrigeration chamber 14 gradually rises, whereby the frost layer formed on the surface of the cooler 24 is removed.

Thereafter, when the surface temperature of the refrigeration cooler 24 reaches about +3.5° C., defrosting is completed. The output voltage signal from the comparator 142 is inverted, the transistor 130 is rendered nonconductive, and the electromagnetic valve 30 is switched. Therefore, a refrigerant flow path is formed, thereby automatically cooling the refrigeration chamber 16, as shown in FIG. 6C. This operating mode continues until the freezer cooler 16 is cooled to the target temperature, whereat the voltage $V_4$ becomes lower than the voltage $V_C$, and the output voltage signal from the comparator 172 goes low. Therefore, the compressor 20 is deenergized in the same manner as previously described. The compressor 20 is not energized again until the temperature in the freezer 12 rises to a predetermined target temperature such as −10° C.

In the refrigerator of the above embodiment of the invention, when the refrigeration cooler 24 is overloaded during cooling and a frost layer is formed on its surface, the refrigerant is not supplied to the refrigeration cooler 24. In this condition, the defrost mode has first priority over any other mode. Furthermore, in the temperature control circuit 140, the surface temperature of the cooler 24 is detected by the comparator 142 which uses two different reference levels, and which has the hysteresis output voltage characteristics shown in FIG. 5, thereby controlling the operation of the electromagnetic valve 30. Therefore, erroneous operation of temperature control which is caused by small variations in temperature, noise generated during ON/OFF operation of the compressor 20, and the like, is completely prevented. Therefore, an erroneous operation protection circuit need not be arranged.

A temperature control apparatus according to another embodiment of the present invention will be described with reference to FIG. 7. In the circuit diagram of a temperature control circuit 300, the same reference numerals as used in FIG. 4 denote the same parts in FIG. 7, and a detailed description thereof will be omitted. According to the apparatus of the first embodiment described with reference to FIGS. 1 to 6, when the fast freezing start switch 74 is turned on or when the actual air temperature within the freezer 12 which is detected by the thermosensor 18 arranged therein exceeds the target temperature, the compressor 20 is energized. Therefore, the freezer 12 is sufficiently cooled, and the compressor 20 is not turned on for a long period of time. As a result, the temperature in the refrigeration chamber 14 rises, affecting the food stored therein.

Figure 7:
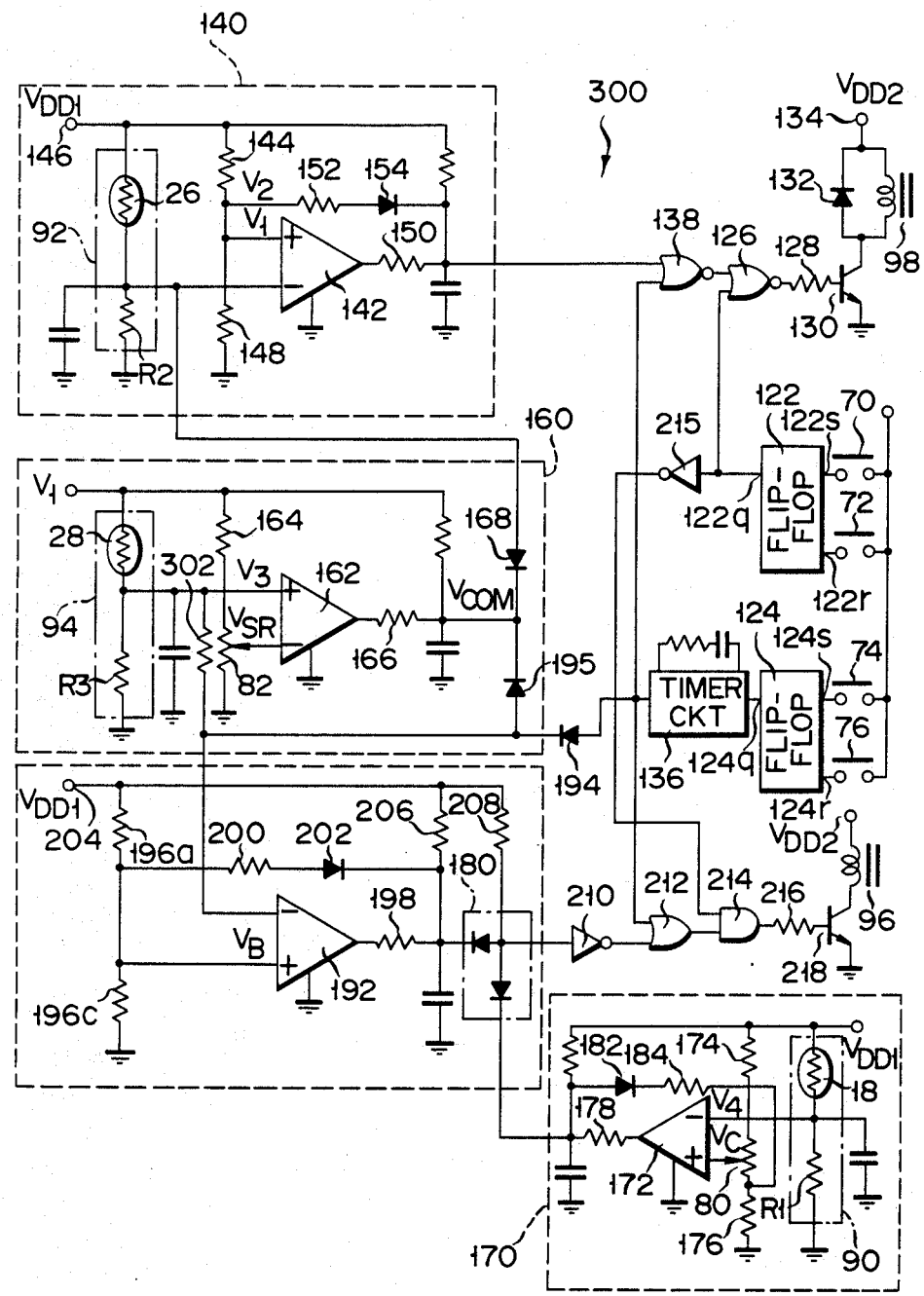
FIG. 7 is a circuit diagram showing a refrigerant flow control circuit arranged in an electric refrigerator according to another embodiment of the present invention.

The circuit shown in FIG. 7 is an improved circuit of the circuit shown in FIG. 4 so as to solve the above problem. The ON/OFF operation of the compressor 20 can be also controlled in accordance with the temperature within the refrigeration chamber 14. According to the second embodiment, a voltage signal $V_3$ supplied to the non-inverting input terminal of a comparator 162 is simultaneously supplied to the non-inverting input terminal of a comparator 192 through a resistor 302.

In the circuit arrangement shown in FIG. 7, rapid freezing initiated when the user depresses a fast freezing start switch 74 is the same as that in the circuit of the first embodiment. The operation following the end of operation of a timer circuit 136 (i.e., the end of rapid freezing) will be described hereinafter.

When the voltage $V_3$ of the temperature detection signal (indicating the air temperature in the refrigeration chamber) from a thermosensor 28 is higher than the voltage $V_B$ at the time when these voltages are applied to the comparator 192, the comparator 192 generates a low level signal. Therefore, the signal transferred from an AND gate 180 to an inverter 210 is set at low level. An inverter 212 generates a high level signal which is supplied to an AND gate 214. The AND gate 214 simultaneously receives a high level signal from an inverter 215. The AND gate 214 supplies a high level signal to a transistor 218 which is then turned on, thereby energizing a compressor 20. In this manner, a refrigeration chamber 14 is cooled by a cooler 24, and the temperature within the refrigeration chamber 14, which is detected by the thermosensor 28, is lowered. When the signal voltage $V_3$ detected by the thermosensor 28 is lower than the voltage $V_B$, the output voltage signal from the comparator 192 goes high. The output voltage signal from the AND gate 214 goes low. The transistor is rendered nonconductive, and the compressor 20 is deenergized.

In the temperature control apparatus according to the second embodiment of the present invention, the ON/OFF operation of the compressor 20 is controlled in response to the thermosensor 18 (arranged in the freezer 12) and the timer circuit 136 in the same manner as in the first embodiment. Furthermore, the ON/OFF operation of the compressor 20 is also controlled in response to the output signal from the thermosensor 28 for detecting the air temperature in the refrigeration chamber 14. Therefore, the ON/OFF operation of the compressor 20 can be properly controlled in direct response to the air temperature in the refrigeration chamber 14, thereby eliminating the drawback of the first embodiment.

Although the present invention has been shown and described with respect to particular embodiments, various changes and modifications which are obvious to a person skilled in the art to which the invention pertains are deemed to lie within the spirit and scope of the invention.

What is claimed is:

1. An electric refrigerator comprising:
   (a) a housing defining therein a freezer and a refrigeration chamber which are thermally insulated from each other;
   (b) first and second coolers independently arranged in said freezer and said refrigeration chamber, respectively;
   (c) compressor means for delivering a refrigerant;
   (d) valve means for switching a refrigerant channel, which is formed to include said first and second coolers, between a first refrigerant flow path through which the refrigerant flows only in said first cooler and a second refrigerant flow path through which the refrigerant flows in said first and second coolers;
   (e) first control circuit means for causing said valve means to form said first refrigerant flow path for a predetermined interval of time and energizing said compressor means, so as to deenergize said compressor means when a freezer temperature and a refrigeration chamber temperature are respectively lower than first and second reference temperatures after the predetermined time interval has elapsed, and so as to continuously energize said compressor means and cause said valve means to form said chamber temperature is higher than the second reference temperature; and
   (f) second control circuit means, connected to said valve means, for independently detecting a temperature of said second cooler and the air temperature in said refrigerator chamber, and for causing said valve means to switch the refrigerant channel to said first refrigerant flow path when, while the temperature of said second cooler is lowered from a third reference temperature to a fourth reference temperature, the air temperature in said refrigeration chamber is kept higher than a predetermined fifth reference temperature falling within a range between the third and fourth reference temperatures.

2. The electric refrigerator according to claim 1, wherein said second control circuit means causes said valve means to switch the refrigerant channel to said second refrigerant flow path when the temperature of said second cooler rises from the fourth reference temperature to the third reference temperature due to interruption of refrigerant supply.

3. The electric refrigerator according to claim 2, wherein said second control circuit means comprises:
  first and second thermosensor means for detecting the temperature of said second cooler and the air temperature in said refrigeration chamber so as to generate electrical signals corresponding to detected temperatures, respectively;
  first controller means, connected to said first thermosensor means and responsive to the electrical signal from said first thermosensor means, for generating a first logic signal when the temperature of said second cooler is higher than the third reference temperature, for generating a second logic signal when the temperature of said second cooler is lower than the fourth reference temperature, for generating the first logic signal when the temperature of said second cooler has fallen from the third reference temperature to the fourth reference temperature, and for generating the second logic signal when the temperature of said second cooler has risen from the fourth reference temperature to the third reference temperature; and
  second controller means, connected to said second thermosensor means and said first controller means and responsive to the electrical signal from said second thermosensor means, for forcedly causing said first controller means to produce the second logic signal when the air temperature in said refrigeration chamber is lower than the fifth reference temperature.

4. The electric refrigerator according to claim 3, further comprising
  valve driving means, connected between said valve means and said first controller means, for driving said valve means in response to an output signal from said first controller means so as to cause said valve means to form said second refrigerant flow path when said valve driving means receives the first logic signal from said first controller means and to form said first refrigerant flow path when said valve driving means receives the second logic signal from said first controller means.

5. The electric refrigerator according to claim 4, wherein said first controller means comprises:
  a first comparing circuit having an inverting input, a non-inverting input and an output, said first thermosensor means being connected between a power supply terminal for receiving a power source voltage and the inverting input of said first comparing circuit; and
  reference voltage switching circuit means, connected to the non-inverting input of said first comparing circuit, for supplying a first reference voltage corresponding to the third reference temperature to the non-inverting input of said first comparing circuit when an output potential of said comparing circuit is substantially equal to a level of the second logic signal, and for supplying a second reference voltage to the non-inverting input of said first comparing circuit, which corresponds to the fourth reference temperature and which is lower than the first reference voltage, when the output potential of said first comparing circuit is substantially equal to a level of the first logic signal.

6. The electric refrigerator according to claim 5, wherein said reference voltage switching circuit means includes:
  a resistor circuit for receiving the power source voltage and for dividing the power source voltage in accordance with a predetermined voltage division ratio so as to supply a divided voltage as the first reference voltage to said first comparing circuit; and
  a diode connected between the non-inverting input and the output of said first comparing circuit, said diode being rendered conductive when a voltage at said output of said first comparing circuit is the first logic signal, thereby generating the second reference voltage.

7. The electric refrigerator according to claim 5, wherein said second controller means comprises:
  a second comparing circuit having an inverting input, a non-inverting input and an output, said second thermosensor means being connected to the non-inverting input of said second comparing circuit; and
  voltage divider means, connected to the inverting input of said second comparing circuit, for supplying a third reference voltage corresponding to the fifth reference temperature.

8. The electric refrigerator according to claim 7, further comprising:
  a diode connected between the inverting input of said first comparing circuit and the output of said second comparing circuit so as to have as a forward biasing direction a direction running from the inverting input of said first comparing circuit to the output of said second comparing circuit.

* * * * *